United States Patent
Winzell et al.

(10) Patent No.: US 12,493,939 B2
(45) Date of Patent: Dec. 9, 2025

(54) METHOD AND A DEVICE FOR REDUCING A DYNAMIC RANGE OF AN IMAGE

(71) Applicant: Axis AB, Lund (SE)

(72) Inventors: Thomas Winzell, Lund (SE); Jesper Bengtsson, Lund (SE)

(73) Assignee: Axis AB, Lund (SE)

( * ) Notice: Subject to any disclaimer, the term of this patent is extended or adjusted under 35 U.S.C. 154(b) by 261 days.

(21) Appl. No.: 18/493,057

(22) Filed: Oct. 24, 2023

(65) Prior Publication Data
US 2024/0153050 A1    May 9, 2024

(30) Foreign Application Priority Data
Oct. 31, 2022 (EP) ..................................... 22204703

(51) Int. Cl.
*G06T 5/90* (2024.01)
*G06T 5/40* (2006.01)
*G06V 10/75* (2022.01)

(52) U.S. Cl.
CPC ................ *G06T 5/90* (2024.01); *G06T 5/40* (2013.01); *G06V 10/751* (2022.01); *G06V 10/758* (2022.01)

(58) Field of Classification Search
CPC . G06T 2207/10048; G06T 2207/20012; G06T 2207/20208; G06T 2207/20224; G06T 2207/30232; G06T 5/20; G06T 5/40; G06T 5/90; G06T 5/94; G06V 10/751; G06V 10/758
See application file for complete search history.

(56) References Cited

U.S. PATENT DOCUMENTS

| | | |
|---|---|---|
| 2008/0019608 A1 | 1/2008 | Zuro |
| 2008/0037897 A1 | 2/2008 | Chiang et al. |

(Continued)

FOREIGN PATENT DOCUMENTS

| | | | | |
|---|---|---|---|---|
| EP | 3672219 A1 | | 6/2020 | |
| EP | 3433833 | * | 7/2021 | ............. G06T 5/00 |
| KR | 20110112165 | * | 10/2011 | ............. H04N 19/13 |

OTHER PUBLICATIONS

R. Soundrapandiyan, "Adaptive pedestrian detection in infrared images using background subtraction and local thresholding", Paper, School of Computing Science and Engineering, VIT University, India, (2015).

(Continued)

*Primary Examiner* — Zhiyu Lu
(74) *Attorney, Agent, or Firm* — Volpe Koenig

(57) ABSTRACT

A method for reducing a dynamic range of an image, whereby first and second images have pixel values of a first bit depth. One or more peak regions and a representative pixel value for each peak region is identified in a histogram of the pixel values in the first image. For pixel values in the first image that are within a peak region, a pixel value difference is calculated as a difference between the pixel value and the representative pixel value of the peak region. For pixel values in the first image that are outside of the peak regions, the pixel value difference is zero. The pixel values of the second image are transformed to reduce the bit depth to a second bit depth. The pixel value differences calculated from the first image are then added to the pixel values of the transformed second image.

13 Claims, 4 Drawing Sheets

(56) References Cited

U.S. PATENT DOCUMENTS

2010/0290715 A1* 11/2010 Kimata .................... G06T 5/50
382/300
2020/0193574 A1  6/2020 Winzell

OTHER PUBLICATIONS

A. Rossi, "A comparative analysis of dynamic range compression techniques in IR images for maritime applications", Thesis, Proceedings of the SPIE, (2013).

Extended European Search Report issued on Apr. 25, 2023 for European Patent Application No. 22204703.7.

* cited by examiner

METHOD AND A DEVICE FOR REDUCING A DYNAMIC RANGE OF AN IMAGE

TECHNICAL FIELD

The present invention relates to the field of image processing. In particular, it relates to a method and a device for reducing a dynamic range of an image.

BACKGROUND

The dynamic range of an image captured by an image sensor is related to the bit depth, i.e., the number of bits that are used to represent the pixel value in each pixel of the image. With a higher bit depth, an image of a higher dynamic range can be achieved. In recent years, high dynamic range image sensors have reached the market. For example, for thermal cameras there are high dynamic bolometer sensors which provide images where each pixel value is represented by up to 21 bits. A reason for using such a high dynamic range sensor is that it has a high sensitivity to small variations in temperature, at the same time as it is sensitive to temperatures in a wide temperature range.

In some situations, the dynamic range of an image produced by an image sensor needs to be reduced, for instance due to technical limitations of other components of an imaging system. One such situation, described in the patent document US2008/0019608A1, is when the output of an image sensor with a high dynamic range is to be rendered on a display device which has a lower dynamic range than the image sensor. Another situation is when an image produced by a high dynamic range image sensor is to be processed in an image processing pipeline which is designed to process images of a lower dynamic range than those provided by the image sensor. For example, the image processing pipeline may be designed to process images with a bit depth of 10 bits, while the image sensor provided an image with a bit depth of 21 bits.

Various methods exist for reducing the dynamic range of an image from a first bit depth to a second, lower, bit depth. This includes methods which apply a linear transformation to the pixel values in the image to map them from a range of pixel values represented at the first bit depth, to a range of pixel values that can be represented at the second, lower, bit depth. The linear transformation is advantageous in that it is computationally cheap to implement but has the disadvantage that many details in the image are lost when the transformation is applied. There are also more sophisticated methods where non-linear transformations are applied to the pixel values, such as histogram equalization methods. The more sophisticated methods are typically more computationally expensive but have the advantage of preserving more details in the image.

However, there are cases when one does not have the computational resources to implement a more sophisticated method, while there is still a need for preserving the details in the image. One such example is when a surveillance camera with limited processing power is to detect and recognize objects in image data, a process which puts high requirements on the level of detail in the images. There is thus room for improvements.

SUMMARY OF THE INVENTION

In view of the above, it is thus an object of the present invention to mitigate the above problems and provide a method for reducing the dynamic range of an image which can be implemented in a computationally efficient way at the same time as it preserves details in the image.

According to a first aspect, the above object is achieved by a method for reducing a dynamic range of an image as defined by the first independent claim. The method comprises:

receiving a first image and a second image which have pixel values of a first bit depth, wherein each pixel in the first image has a spatially corresponding pixel in the second image, and wherein the first and the second image are either the same image or subsequent images in a video sequence, analyzing a histogram of the pixel values in the first image to identify one or more peak regions in the histogram and a representative pixel value of each peak region, calculating a pixel value difference for each pixel in the first image, wherein for each pixel in the first image having a pixel value within a peak region, the pixel value difference is a difference between the pixel value of the pixel in the first image and the representative pixel value of the peak region, and for each pixel in the first image having a pixel value outside the one or more peak regions, the pixel value difference is zero, transforming the second image to reduce its dynamic range by applying a transformation which reduces a bit depth of each pixel value in the second image from the first bit depth to a second, lower, bit depth, and for each pixel in the transformed second image, adding the pixel value difference calculated for a spatially corresponding pixel in the first image to the pixel value of the pixel in the transformed second image.

With this method, details in the form of calculated pixel value differences are added to the second image after it has been subject to a bit depth-reducing transformation. In that way, one can compensate for the fact that details are lost in the bit-depth reducing transformation. As a result, a transformation which is computationally efficient can be used, such as the previously mentioned linear transformation, even if it will cause details to be lost in the transformation.

The pixel value differences are calculated from a histogram of the pixel values in a first image of the higher dynamic range, i.e., which has the first bit depth. When calculating the pixel values differences, only pixels in the first image having a pixel value within a peak region of the histogram are given a non-zero pixel value difference. In this way, noise can to a high degree be suppressed, since noise tends to spread out evenly in the histogram rather than forming peaks. The non-zero pixel value difference is calculated as a difference between the pixel value of the pixel and a representative pixel value of the peak region. As a result of that approach, the pixel value differences tend to preserve the shape of the peaks in the histogram. Further, by calculating the difference in this way, it is found that the difference typically is of a magnitude which allows it to be represented using the second, lower, bit depth, although rescaling may be needed in some cases as will be described below.

To this end it is noted that the invention is particularly advantageous in situations where the pixel values in the images cover a wide range of pixel values, but where one is interested in distinguishing details, i.e., small pixel value differences, in several different parts of that range. One such case is in thermal images which depict a scene in which the temperatures span a range of several hundred degrees Celsius, but where one is interested to distinguish details both in a lower end of the range (e.g., corresponding to the temperature of a person) and in an upper end of the range (e.g., corresponding to the temperature of a fire). If a linear stretching were applied in that case without enhancing the details as suggested by the invention, a lot of details would be lost which in worst case would render the resulting image useless for its intended purpose.

The dynamic range of an image may generally be defined as the ratio between the largest pixel value and the smallest pixel value in the image.

As mentioned, the dynamic range of an image is related to the bit depth of the image. The bit depth is the number of bits that are used to represent the pixel value in each pixel in the image. With a higher bit depth an image of a higher dynamic range can be achieved than with a lower bit depth.

In the context of this application, reducing the dynamic range of an image refers to reducing the bit depth of the image.

The first image and the second image mentioned herein may be the same image. In that case, it is understood that it is enough to receive that image in the receiving step of the method. However, embodiments where they are subsequent images in a video sequence can also be envisaged. For example, the second image may be the image next after the first image in the video sequence. In either case, it is understood that the first and the second image typically are of the same pixel size, such as both being of size M×N pixels.

The first image and the second image have spatially corresponding pixels. In particular, each pixel in the first image has a spatially corresponding pixel in the second image, and vice versa. A pixel in the first image and a pixel in the second image are spatially corresponding if they have the same pixel coordinates. The pixel with pixel coordinate (i,j) in the first image is spatially corresponding to the pixel with pixel coordinate (i, j) in the second image.

A pixel value may also be referred to as an intensity of the pixel. For a thermal image, the pixel value or intensity reflects the amount of IR-radiation from the scene and is proportional to temperature. For visual light images, the pixel value or intensity reflects the amount of radiation in the visual part of the spectrum, which is also known as luminance.

In cases where there is a relatively large difference between the first bit depth and the second bit depth, one may arrive at the situation where the pixel value differences are of a magnitude which cannot be represented on the scale offered by the second, lower, bit depth. In these cases, it may be advantageous to rescale the pixel value differences before adding them to the pixel values in the transformed second image. The method may therefore further comprise, for each pixel in the transformed second image, scaling the pixel value difference calculated for a spatially corresponding pixel in the first image by a multiplicative factor before adding it to the pixel value of the pixel in the transformed second image.

The multiplicative factor may be the same for all pixel value differences. For example, it may be a predetermined factor which depends on the first bit depth and the second bit depth. Alternatively, each peak region may be associated with a multiplicative factor, wherein a pixel value difference calculated from a pixel in the first image having a pixel value within a peak region is scaled by the multiplicative factor associated with that peak region. In that way, one can for instance adapt the multiplicative factor to take different peak widths into account. For example, a wider peak typically results in larger pixel value differences than a narrower peak. Thereby a smaller multiplicative factor may be needed for the wider peak than for the narrower peak in order for the pixel value differences to be accommodated within the range of values that can be represented at the second, lower, bit depth. Alternatively, the multiplicative factors can be set to give different importance to different peaks. For example, one peak in the histogram could be considered more important than another and therefore be associated with a larger multiplicative factor. For example, in the case of a thermal camera, a peak in a certain temperature interval (corresponding to a human or perhaps a beginning fire) could be considered more important than peaks in other temperature intervals.

When a pixel value difference is added to a pixel value of the transformed second image, there is a risk that the resulting sum will be larger than a maximum value or smaller than a minimum value that can be represented at the second bit depth. If that happens, and no countermeasure is taken, the values can "wrap-around" which would lead to disturbing artefacts. The method may therefore further comprise, after the step of adding, restricting the pixels values in the transformed second image to be between a minimum and a maximum value that can be represented at the second bit depth. This procedure is sometimes referred to as clamping.

As used herein, a peak region of the histogram refers to an interval of pixel values around a peak in the histogram. A pixel value within that interval may be said to fall within or belong to the peak region. The histogram specifies frequency values for the pixel values in the first image. The frequency values specify how frequent, i.e., how many times, different pixel values appear in the first image. The frequency values may further be normalized by the number of pixels in the image. According to embodiments, a peak region of the histogram is identified as an interval of at least a predefined number of consecutive pixel values for which the frequency values exceed a predefined frequency threshold. In other words, the frequency value should have stayed above the predefined frequency threshold for a contiguous interval of pixel values of at least a certain length in order for the interval to qualify as a pixel region. In other words, there are two thresholds involved in the identification: a first threshold, the frequency threshold, which specifies the minimum frequency of the pixel values in the peak region; and a second threshold, a peak width threshold, which specifies the minimum width of the peak region.

The representative pixel value of a peak region is a pixel value which is representative of the pixel values which fall within the peak region. The representative pixel value may be a statistic which describes the central tendency of the pixel values in the peak region, i.e., where the "middle" or "center" or the peak region is located. For example, the representative pixel value of a peak region of the histogram may be one of: a center of an interval defining a lowest and a highest pixel value of the peak region of the histogram, a statistical mean of the pixel values in the first image that falls within the peak region of the histogram, a mode of the peak region of the histogram (i.e., the most frequent pixel value in the peak region), and a median of the pixel values in the first image that falls within the peak region of the histogram.

As mentioned above, a realization behind the invention is that since pixel value differences calculated from a higher dynamic range image are added to the second image after it has been transformed to a lower dynamic range image, it does not matter so much if details are lost in the transformation. This opens up for using a "simple" transformation which is computationally efficient, even if it will cause details to be lost in the transformation. For example, the transformation which reduces the bit depth of each pixel value in the second image may include a linear stretching. A linear stretching is a linear mapping from a range of pixel values that can be represented by the first bit depth to a range of pixel values that can be represented by the second bit depth.

The method may further comprise buffering the calculated pixel value differences in an image buffer. In that way, the pixel value differences can be temporarily stored before being added to the transformed second image.

The first and the second images may generally be any types of images, such as images captured by a camera which is sensitive to light in the visual part of the spectrum. In a particularly advantageous embodiment, the first and the second images are however thermal images. The use of high dynamic range sensors, such as sensors which provide images with bit depths of 18 to 21 bits, is often more relevant for thermal imaging than for visual light imaging. The reason for that is that thermal sensors typically have a lower resolution than visual light sensors, and one can therefore afford the extra processing cost for processing images of a higher bit depth. For a visual light sensor with a higher resolution, the processing cost would be infeasible for such high bit depth. Another reason for the invention being particularly favorable for thermal images is that it is often desirable that the thermal images should include as many details as possible. Hence, being able to reduce the dynamic range of an image while still enhancing details is especially important for thermal images. This is in contrast to visual light images whose primary purpose is to be "eye-pleasing" rather than conveying details.

According to a second aspect of the invention, the above object is achieved by a processing device for reducing a dynamic range of an image as defined by the second independent claim.

According to a third aspect of the invention, the above object is achieved by a non-transitory computer readable medium as defined by the third independent claim.

The second and third aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown.

Figure 1:
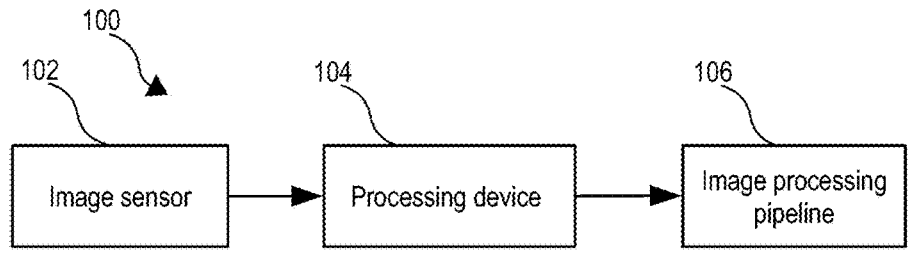
FIG. 1 illustrates a system in which example embodiments can be implemented.

FIG. 1 illustrates a system 100 in which embodiments of the invention can be implemented. The system 100 comprises an image sensor 102, a processing device 104, and an image processing pipeline 106. The system 100 may be included in a camera, such as a thermal camera or a visual light camera.

The image sensor 102 captures images which have pixel values of a first bit depth k. This means that k bits are used to represent each pixel value, and accordingly there are $2^k$ possible pixel values for each pixel. The exact value of the first bit depth may vary depending on which image sensor is used, but in one example the first bit depth can be equal to 16.

The wavelengths to which the image sensor is sensitive may vary between embodiments. For instance, the image sensor 102 may be sensitive in the infrared part of the spectrum, e.g., it may be a bolometer sensor, or it may be sensitive in the visual part of the spectrum. The image sensor 102 may further be arranged to capture a sequence of images which constitute image frames of a video sequence.

The image processing pipeline 106 processes the images captured by the image sensor 102. However, the image processing pipeline 106 only has the capacity to process images with a second bit depth k−j, which is lower than the first bit depth k. Accordingly, the image processing pipeline 106 is only able to process images which have at most $2^{k-j}$ possible values for each pixel. As is known in the art, an image processing pipeline 106 includes a number of sequential processing steps which for instance serve to enhance and compress the image data. Examples of such processing steps include noise reduction, global/local detail enhancement (such as CLAHE processing), sharpening etc. For the purposes of this disclosure, a standard image processing pipeline 106 can be used.

In order for the image processing pipeline 106 to process an image captured by the image sensor 102, the bit depth of the image first needs to be reduced from the first bit depth k to the second bit depth k−j. As will be explained, such a reduction is carried out by the processing device 104.

Figure 2:
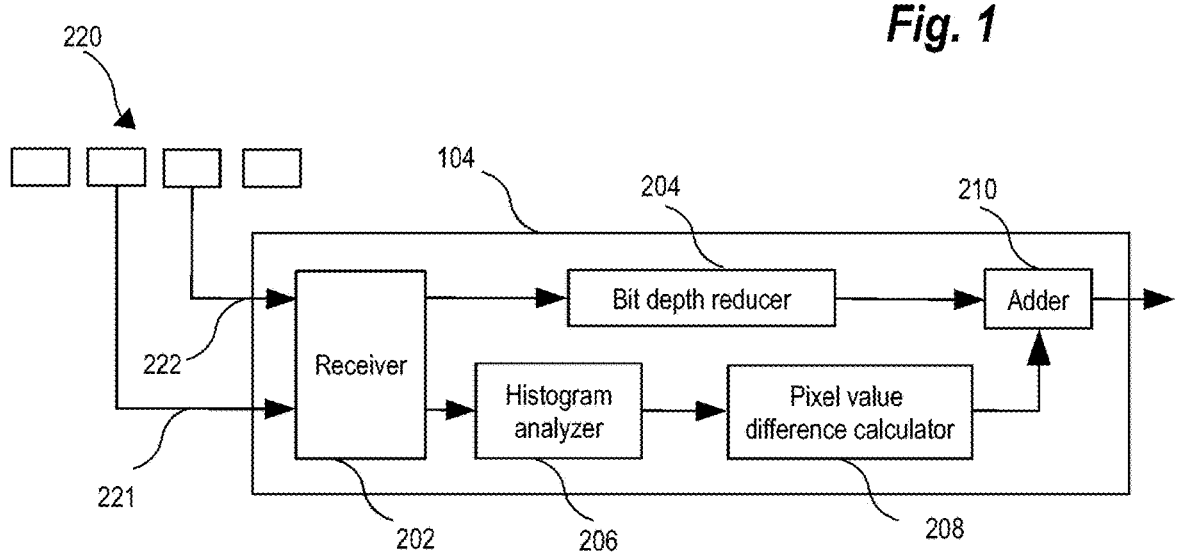
FIG. 2 schematically illustrates a processing device according to exemplary embodiments where two different images are input to the device.
Figure 3:
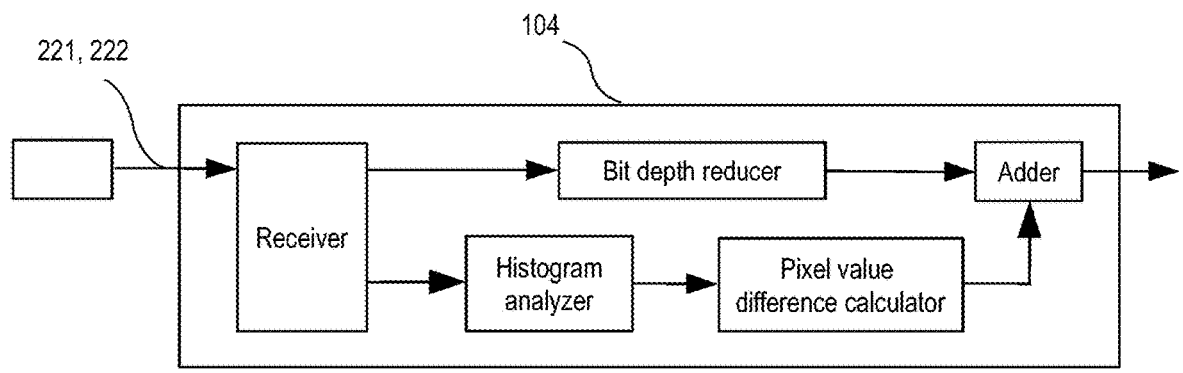
FIG. 3 schematically illustrates a processing device according to embodiments where a single image is input to the device.

The processing device 104 is illustrated in more detail in FIGS. 2 and 3. The processing device 104 includes a receiver 202, a bit depth reducer 204, a histogram analyzer 206, a pixel value difference calculator 208, and an adder 210.

The processing device 104 thus comprises various components 202, 204, 206, 208, 210 which are configured to implement the functionality of the device 104. In particular, each illustrated component corresponds to a functionality of device 104. Generally, the device 104 may comprise circuitry which is configured to implement the components 202, 204, 206, 208, 210 and, more specifically, their functionality.

In a hardware implementation, each of the components 202, 204, 206, 208 may correspond to circuitry which is dedicated and specifically designed to provide the functionality of the component. The circuitry may be in the form of one or more integrated circuits, such as one or more application specific integrated circuits or one or more field-programmable gate arrays. By way of example, the bit depth reducer 204 may thus comprise circuitry which, when in use, transforms an image to reduce its dynamic range.

In a software implementation, the circuitry may instead be in the form of a processor, such as a central processing unit or a graphical processing unit, which in association with computer code instructions stored on a (non-transitory) computer-readable medium, such as a non-volatile memory, causes the device 104 to carry out any method disclosed herein. Examples of non-volatile memory include read-only memory, flash memory, ferroelectric RAM, magnetic computer storage devices, optical discs, and the like. In a software case, the components 202, 204, 206, 208 may thus each correspond to a portion of computer code instructions stored on the computer-readable medium, that, when executed by the processor, causes the device 104 to carry out the functionality of the component.

It is to be understood that it is also possible to have a combination of a hardware and a software implementation, meaning that the functionality of some of the components 202, 204, 206, 208, 210 are implemented in hardware and others in software.

Figure 4:
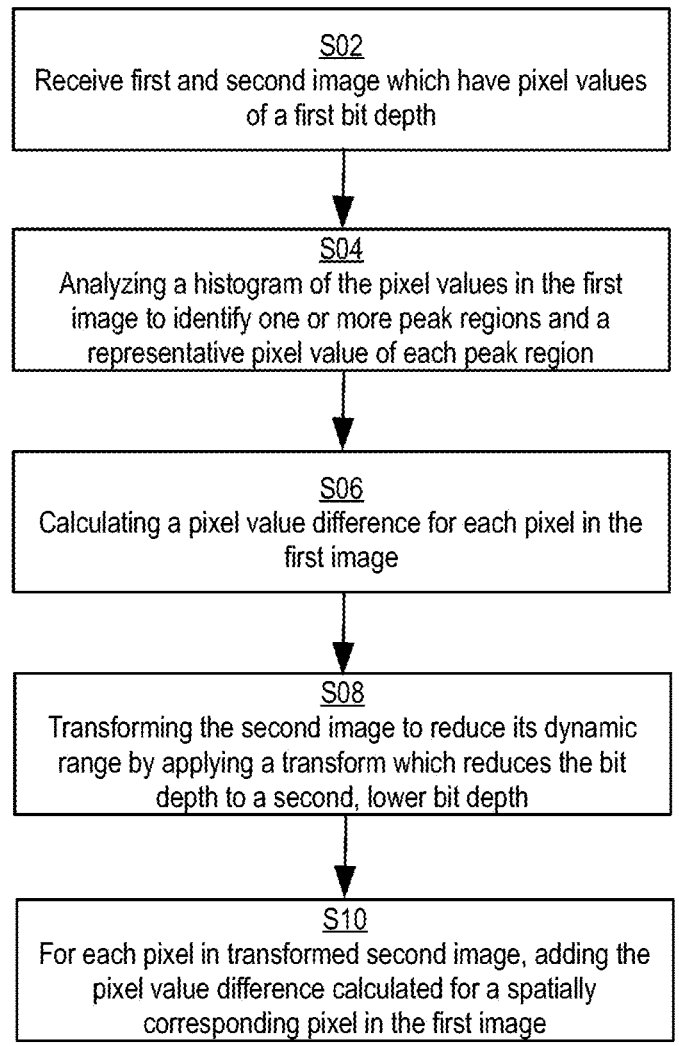
FIG. 4 is a flow chart of a method for reducing a dynamic range of an image.

The operation of the processing device 104 when carrying out a method for reducing a dynamic range of an image will now be explained with reference to FIGS. 1-3, 5 and the flowchart of FIG. 4.

Figure 5:
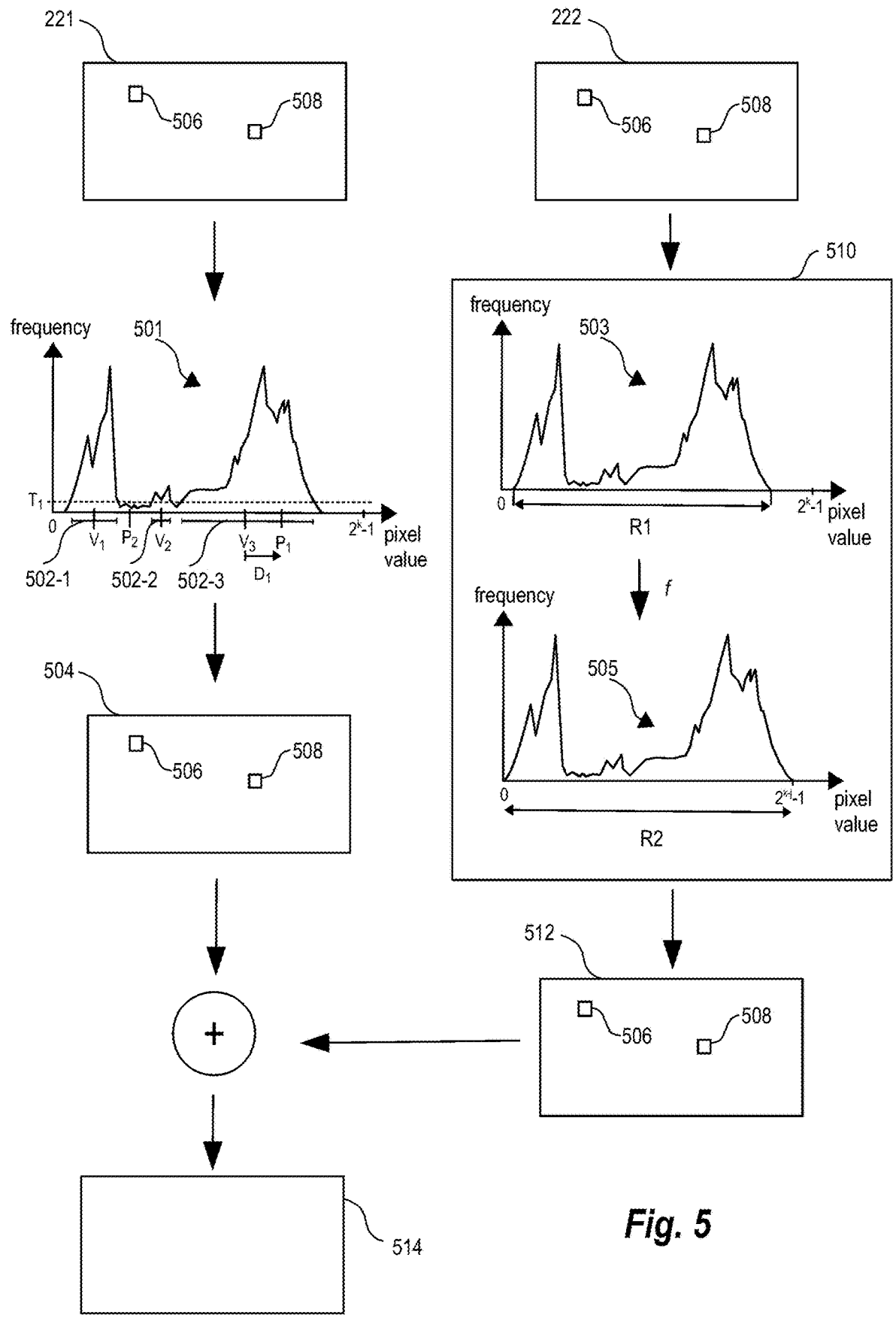
FIG. 5 schematically illustrates various steps of the method of FIG. 4.

In step S02, the receiver 202 receives a first image 221 and a second image 222. The first 221 and the second image 222 are also shown in FIG. 5. The first 221 and the second image 222 are typically of the same dimension, such as M×N pixels, and they have spatially corresponding pixels. That is, for each pixel position 506, 508 in the first image 221, there is a spatially corresponding pixel position 506, 508 in the second image 222, and vice versa. The pixel values in the first 221 and the second image 222 are of the first bit depth k. As explained, this means that there are $2^k$ possible pixel values, such as the integer values 0 to $2^{k-1}$. The first image 221 and the second image 222 are received from the image sensor 102. In some embodiments, and as illustrated in FIG. 2, the first image 221 and the second image 222 are subsequent images of a video sequence 220 captured by the image sensor 102. For instance, the first image 221 may be the image frame directly before the image 222 in the video sequence 220. In other embodiments, and as illustrated in FIG. 3, the first image 221 and the second image 222 are the same image captured by the image sensor 102. For example, they may be the same image in the video sequence 220. In the latter embodiments, it is understood that it is enough that the receiver 202 only receives one image.

The first image 221 is forwarded to the histogram analyzer 206 which, in step S04, proceeds to analyze a histogram of the pixel values in the first image 221. This is further illustrated in FIG. 5, which schematically illustrates a histogram 501 of the first image 221 calculated by the histogram analyzer 206. Along the horizontal axis, the histogram 501 presents the pixel values in the first image 221. As can be seen on the scale, the pixel values can in this case take values between 0 and $2^k-1$, although the full scale is not utilized by the pixel values in this example. On the vertical axis, the histogram 501 presents frequency values of the pixel values in the first image 221, i.e., the number of pixels in the first image 221 that has a certain pixel value. As is known in the art, binning of the pixel values can be used when calculating the histogram. In that case, the pixel values are grouped into bins or intervals of equal width and the frequency value of a bin corresponds to the number of pixel values within the bin. Further, as is also known in the art, the histogram may be normalized by the total number of pixels in the first image 221.

The analysis of the histogram 501 includes identifying one or more peak regions in the histogram 501. A peak region is an interval of pixel values around a peak in the histogram. In the example of FIG. 5, three peak regions 502-1, 502-2, 502-3 are identified. In order to find the peak regions 502-1, 502-2, 502-3, the histogram analyzer 206 may apply a predefined frequency threshold $T_1$ to the frequency values of the histogram 501. A peak region may then be identified as an interval of pixel values for which the frequency values exceed the threshold $T_1$. In some embodiments, the histogram analyzer 206 may apply a further condition that the interval of pixel values should include at least a predefined number of consecutive pixel values which have a frequency value exceeding the frequency threshold $T_1$. That is, the interval should have a width of at least a peak width threshold $T_2$. In that way, one may avoid obtaining peak regions which only includes a single or a few pixel values.

The peak width threshold $T_2$ is a design parameter which, for instance, may be set as a certain percentage of the total amount of pixel values that can be represented at the first bit depth. By way of example, it may be set to 5% of the total amount of pixel values that can be represented at the first bit depth. The peak width threshold $T_2$ can also be set depending on the noise of the sensor 102. For example, for a thermal sensor (bolometer sensor) the noise equivalent temperature difference (NETD) is a measure of how well the sensor is able to distinguish between small differences in thermal radiation in the image. The peak width threshold $T_2$ can be set to be equal to the NETD. Notably, the NETD may depend both on ambient temperature and temperature of the target (i.e., the pixel values in the image). This means that the peak width threshold $T_2$ may depend on the pixel values in a candidate peak region so that it takes different values for a relatively lower part of the range of possible pixel values compared to a relatively higher part of the range of possible pixel values. By way of example, the peak width threshold $T_2$ for human object temperatures in a thermal image will be different compared to the peak width threshold $T_2$ compared to high temperature objects of several hundred degrees Celsius.

Likewise, the value of the frequency threshold $T_1$ is a design parameter. The frequency threshold $T_1$ may be set depending on the range of pixel values represented in the first image 221, i.e., the range spanned by the lowest pixel value in the first image 221 and the highest pixel value in the first image 221. The wider the range, the lower the frequency threshold $T_1$. To exemplify, consider, on the one hand, a room temperature scene with a human object depicted by a thermal sensor. In such a scene the pixel values would range from, e.g., 18-34 degrees Celsius, and most pixel values within that range would likely be represented in the image. On the other hand, consider a scene with cold sky, moderate outdoor temperature, human objects, and really high temperature machinery. In such a scene, the pixel values would instead range from 0-200 degrees Celsius, but many pixel values within the range would not be represented. The former of these two scenes would require a higher frequency threshold $T_1$ than the latter. Notably, since the frequency threshold $T_1$ may depend on scene content, i.e., the range of pixel values represented in the first image 221, it could vary between frames of a video sequence.

In step S04, the histogram analyzer further identifies a representative pixel value for each peak region 502-1, 502-2, 502-3. In FIG. 5, the representative pixel values V1, V2, V3 are identified for peak regions-502-1, 502-2, 502-3, respectively.

The histogram analyzer 206 may calculate the representative pixel value V1, V2, V3 of a peak region 502-1, 502-2, 502-3 from the pixel values that falls within the peak region 502-1, 502-2, 502-3. This may be carried out in different ways.

In one embodiment, the representative pixel value V1, V2, V3 of a peak region 502-1, 502-2, 502-3 is calculated as a center of an interval defining a lowest and a highest pixel value of the peak region 502-1, 502-2, 502-3 of the histogram 501. This is the case in the example of FIG. 5. In more detail, as described above, a peak region is an interval of pixel values around a peak in the histogram. That interval has a lowest pixel value and a highest pixel value between which the interval extends. The representative pixel value may be calculated as the center of that interval, i.e., as the mean value of the lowest pixel value and the highest pixel value in the interval. This way of calculating the representative pixel value is computationally efficient and provides a particularly good result for peaks having a symmetric shape, such as peaks which follow a Gaussian distribution.

In another embodiment, the representative pixel value V1, V2, V3 of a peak region 502-1, 502-2, 502-3 is instead calculated as a statistical mean of the pixel values in the first image 221 that falls within the peak region 502-1, 502-2, 502-3 of the histogram 501. When calculating the statistical mean, the distribution of the pixel values in the peak region, i.e., their frequency values are also taken into account in the calculations. More specifically, each pixel value in the peak region will be weighted in proportion to its frequency value. This embodiment has a somewhat higher computational cost, but provides a good result when the peaks have a skewed shape.

In yet another embodiment, the representative pixel value V1, V2, V3 of a peak region 502-1, 502-2, 502-3 is calculated as a mode of the peak region 502-1, 502-2, 502-3 of the histogram 501, i.e., as the most frequent pixel value within the peak region.

In still yet another embodiment, the representative pixel value V1, V2, V3 of a peak region 502-1, 502-2, 502-3 is calculated as a median of the pixel values in the first image 221 that falls within the peak region of the histogram.

In step S06, the pixel value difference calculator 208 then proceeds to calculate a pixel value difference for each pixel in the first image 221. The calculated pixel value differences may temporarily be stored in an image buffer 504 which stores a pixel value difference for each pixel in the first image 221. As will be described later on, the pixel value differences in the buffer 504 will act as a filter to enhance details in a down-scaled version of the second image 222.

The pixel value difference is calculated differently depending on whether or not a pixel value of a pixel is within a peak region 502-1, 502-2, 502-3. Therefore, in order to calculate a pixel value difference for a pixel in the first image 221, the pixel value difference calculator 208 first checks whether or not the pixel value of the pixel is within a peak region 502-1, 502-2, 502-3. Referring to the example of FIG. 5, it is supposed that pixel position 506 of the first image 221 has pixel value P1 which is within the peak region 502-3 and that pixel position 508 has pixel value P2 which is not within any of the peak regions 502-1, 502-2, 502-3.

For a pixel in the first image 221 having a pixel value within a peak region, the pixel value difference is calculated as a difference between the pixel value and the representative pixel value of the peak region. By way of example, the pixel value difference of pixel position 506 in the first image 221 is hence calculated as D1=P1−V3. Notably, the pixel value difference D1 will be positive when the pixel value P1 is larger than the representative pixel value V3, and negative if the pixel value P1 had been lower than the representative pixel value V3. The pixel value difference D1 may be stored in the corresponding pixel position 506 of the image buffer 504.

For a pixel in the first image 221 having a pixel value which is outside the one or more peak regions, the pixel value difference is instead set to zero. In the example of FIG. 5, the pixel value difference of pixel position 508 in the first image 221 will hence be set to zero. The value zero may be stored in the corresponding pixel position 508 of the image buffer 504.

When this is carried out for each pixel in the first image 221, the image buffer 504 will be populated with a pixel value difference for each pixel in the first image 221. Some of these differences will be non-zero and others zero depending on whether the pixel value of the corresponding pixel position in the first image 221 was within or outside a peak region 502-1, 502-2, 502-3.

In step S08, the bit depth reducer 204 transforms the second image 222, and in particular its pixel values, to reduce the dynamic range. As a result of the transformation, a transformed second image 512 is generated. Notably, the transformed second image 512 and the second image 222 will be of the same dimension and have spatially corresponding pixels. However, they will have different pixel values.

In order to transform the second image 222, the bit depth reducer 204 applies a transformation to the pixel values of the second image 222 which reduces the bit depth from the first bit depth k to a second, lower, bit depth k−j, where j≥1. At the first bit depth, integer pixel values in the range $[0, 2^k-1]$ can be represented, while at the second bit depth, integer pixel values in the range $[0, 2^{k-j}-1]$ can be represented. The transformation may hence be seen as a function or mapping $f:[0,2^k-1] \mapsto [0,2^{k-j}-1]$, i.e., a function which maps integer pixel values in the range $[0,2^k-1]$ onto integer pixel values in the range $[0,2^{k-k}1]$. FIG. 5, in box 510, illustrates the histogram 503 of the pixel values in the second image 222 before the transformation $f$ is applied, and the histogram 505 after the transformation $f$ is applied.

Generally, any known bit depth reducing transformation can be used in step S08. In particular, transformations which are computationally efficient can be used and still achieve an acceptable end result. In one embodiment, the transformation is a so-called linear stretching of the pixel values. The linear stretching may involve two sub-steps: first a gain is applied to down-scale the pixel values represented at the first bit depth, and thereafter the resulting value is offset. In one example, the gain G may be calculated according to the following relation:

$$G = \frac{0.5R2}{R1},$$

where R2 is the number of possible pixel values at the second bit depth, i.e., $R2=2^{k-j}$ while R1 is the difference between the maximum and the minimum pixel value in the second image 222 at the first bit depth. The offset O may be calculated according to:

$$O=0.5R2-G \cdot M,$$

where M is the mean pixel value in the second image 222 represented at the second bit depth. By applying such an offset, the mean pixel value in the second image 222 will be mapped to the center of the range of pixel values that can be represented at the second bit depth.

Step S08 is typically carried out after steps S04 and S06. This may especially be the case when the first and the second images 221, 222 are the same image as illustrated in FIG. 3. In that case, the image may first be processed to calculate pixel value differences. When these have been calculated, the image is transformed to the lower bit depth. In that way, there is no need to store and process separate copies of the image as would be needed if the steps were carried out in parallel. When the first and the second images 221, 222 are different images as illustrated in FIG. 2, the order of these steps is not as important and may even be carried out in parallel.

In step S10, the adder 210 proceeds to add pixel value differences to the pixel values in the transformed second image 512. The resulting image is denoted by 514 in FIG. 5. The addition is made pixel-wise and can be accomplished by performing a pixel-wise addition of the transformed second image 512 and the image stored in the image buffer 504. As a result, for each pixel in the transformed second image 512, the pixel value difference calculated for the spatially corresponding pixel in the first image 221 is added to the pixel value in the transformed second image 512. To exemplify, the pixel value at pixel position 506 in the transformed second image 512 and the pixel value difference D1 at the same pixel position 506 in the image buffer 504 are added. In this way, the pixel value differences in the image buffer 504 may be said to act as a filter which serve to enhance details in the transformed second image 512.

In some embodiments, the pixel value differences stored in the image buffer 504 may be scaled by a multiplicative factor before being added to the pixel values of the transformed second image 512. The multiplicative factor may for instance be set such that the largest pixel value difference after scaling is equal to a certain percentage of the number of possible pixel values that can be represented at the second bit depth, i.e., a certain percentage of $2^{k-j}$. For example, the percentage may be set to 10%. One reason for applying the multiplicative factor is to reduce the risk that the sums of the pixel values of the transformed second image 512 and the pixel value differences fall outside the range of pixel values that can be represented at the second bit depth. If that happens, the resulting pixel value after the addition can end up being wrapped to a pixel value within the range, thereby giving rise to artefacts. Therefore, the multiplicative factor may be smaller than one, meaning that the pixel value differences are down-scaled.

The same multiplicative factor can be used for all pixel value differences. However, in some embodiments different peak regions may be associated with different multiplicative factors. The multiplicative factor may be related to the width of the peak region, i.e., the width of the interval of pixel values which make up the peak region. For example, a wider peak region may be associated with a smaller multiplicative factor compared to a less wide peak region. This may for instance, be achieved by setting the multiplicative factor for a peak region such that the largest pixel value difference of the peak region after scaling is equal to a certain percentage of the number of possible pixel values that can be represented at the second bit depth, i.e., a certain percentage of $2^{k-j}$. For example, the percentage may be set to 10%. In that way, the pixel values in the wider peak region will be more down-scaled (if the multiplicative factor is smaller than one) or less up-scaled (if the multiplicative factor is larger than one) compared to the pixel values in the less wide peak region. Another option is to relate the multiplicative factor to an importance of the peak region, such that a higher multiplicative factor is applied to more important peak regions than to less important peak regions. For example, again referring to a thermal image, a peak region corresponding to the temperature range of human may be given higher importance than a peak region corresponding to the temperature range of a cold sky.

After the pixel value differences in the image buffer 504 have been added to the pixel values of the transformed second image 512, the pixel values in the resulting image 514 may be restricted such that they are between a minimum and a maximum value that can be represented at the second bit depth. In this case, the pixel values in the resulting image 514 are hence restricted to at most be equal to $2^{k-j}-1$, and not smaller than zero. Accordingly, if the addition of a pixel value difference to a pixel value in the transformed second image 512 would cause it to be larger than the maximum value, it will be set to be equal to the maximum value. Similarly, if the addition of a pixel value difference to a pixel value in the transformed second image 512 would cause it to be smaller than the minimum value, it will be set to be equal to the minimum value.

Figure 6A:
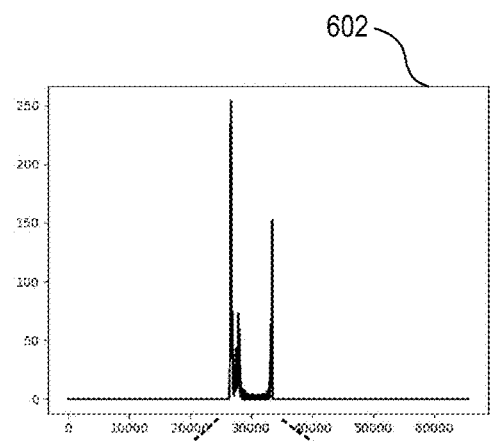
FIGS. 6A-D illustrates the result of the method of FIG. 4 when applied to an image.
Figure 6A:
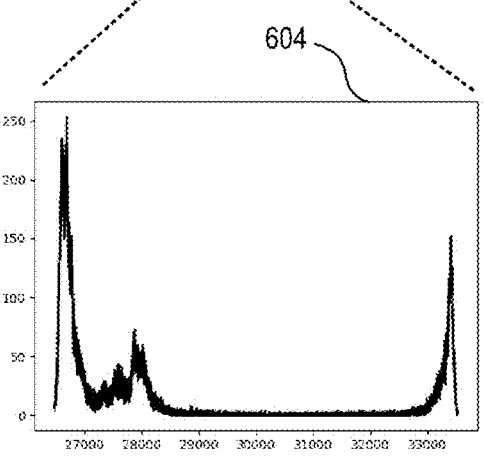
Figure 6B:
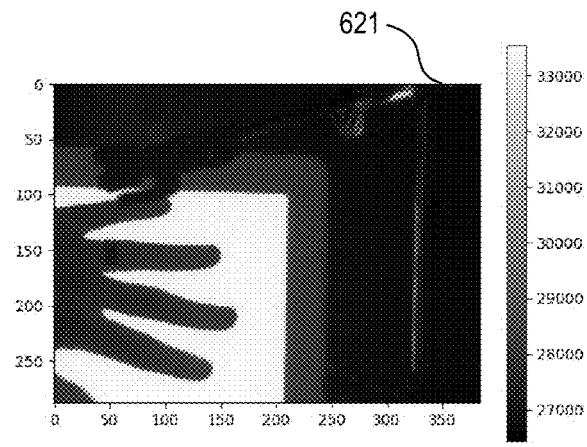
Figure 6C:
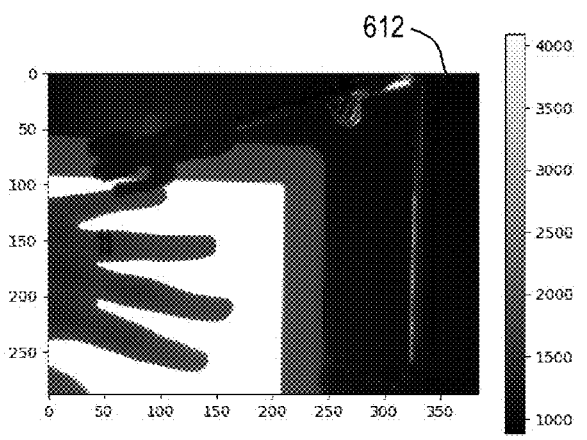
Figure 6D:
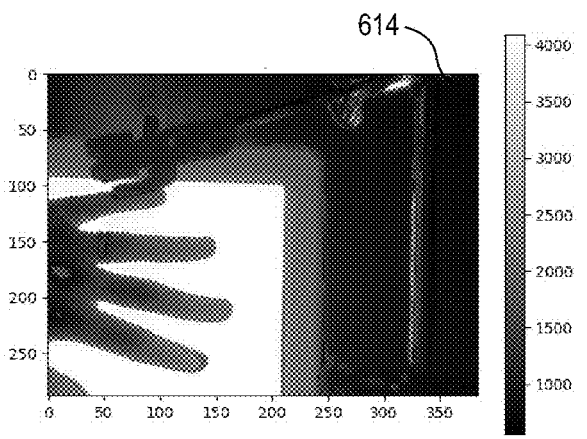

FIGS. 6A-6D illustrates an example where the above-described method is used to reduce the dynamic range of the image 621 illustrated in FIG. 6B. In this example, the first and the second image described above are the same image, namely image 621. The image 621 has a first bit depth of 16 bits, which means that $2^{16}=65536$ different pixel values can be represented. When the method is applied to image 621, it will reduce the bit depth to a second bit depth of 12 bits, which allows for $2^{12}=4096$ different pixel values to be represented. The histogram 602 of image 216 is shown in FIG. 6A. As can be seen, the image 621 does not include pixel values over the whole range of possible pixel values, but rather a sub-range thereof. An enlargement of the histogram 602 in that sub-range is shown as histogram 604 in FIG. 6A. From the histogram 602, ten peak regions were identified, and a representative pixel value was determined for each peak region. In this case, the representative pixel value of a peak region was calculated as the center of the interval defining a lowest and a highest pixel value of the peak region. The peak regions and the representative pixel values were then used to calculate pixel-wise pixel value differences as further described above. The original image 621 was then transformed by applying a linear stretch of the pixel values. In more detail, the pixel values in the image 621 were linearly stretched from the first bit depth (16 bits) to the second bit depth (12 bits). In that way, the transformed image 612 shown in FIG. 6C was obtained. Then, the calculated pixel value differences were added to the transformed image 612, which results in the image 614 shown in FIG. 6D. As can be seen, details are enhanced in the image 614 compared to the linearly stretched image 612.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for reducing a dynamic range of an image, comprising:
   receiving a first image and a second image which have pixel values of a first bit depth, wherein each pixel in the first image has a spatially corresponding pixel in the second image, and wherein the first and the second image are either the same image or subsequent images in a video sequence,
   analyzing a histogram of the pixel values in the first image to identify one or more peak regions in the histogram and a representative pixel value of each peak region,
   calculating a pixel value difference for each pixel in the first image, wherein
   for each pixel in the first image having a pixel value within a peak region, the pixel value difference is a difference between the pixel value of the pixel in the first image and the representative pixel value of the peak region, and
   for each pixel in the first image having a pixel value outside the one or more peak regions, the pixel value difference is zero,
   transforming the second image to reduce its dynamic range by applying a transformation which reduces a bit depth of each pixel value in the second image from the first bit depth to a second, lower, bit depth, and
   for each pixel in the transformed second image, adding the pixel value difference calculated for a spatially corresponding pixel in the first image to the pixel value of the pixel in the transformed second image.

2. The method of claim 1, further comprising:
   for each pixel in the transformed second image, scaling the pixel value difference calculated for a spatially corresponding pixel in the first image by a multiplicative factor before adding it to the pixel value of the pixel in the transformed second image.

3. The method of claim 2, wherein the multiplicative factor is the same for all pixel value differences.

4. The method of claim 2, wherein each peak region is associated with a multiplicative factor, and wherein a pixel value difference calculated from a pixel in the first image having a pixel value within a peak region is scaled by the multiplicative factor associated with that peak region.

5. The method of claim 1, further comprising:
   after the step of adding, restricting the pixels values in the transformed second image to be between a minimum and a maximum value that can be represented at the second bit depth.

6. The method of claim 1, wherein a peak region of the histogram is an interval of pixel values around a peak in the histogram.

7. The method of claim 1, wherein the histogram specifies frequency values for the pixel values in the first image, and wherein a peak region of the histogram is identified as an interval of at least a predefined number of consecutive pixel values for which the frequency values exceed a predefined frequency threshold.

8. The method of claim 1, wherein the representative pixel value of a peak region of the histogram is one of:
   a center of an interval defining a lowest and a highest pixel value of the peak region of the histogram,
   a statistical mean of the pixel values in the first image that falls within the peak region of the histogram,
   a mode of the peak region of the histogram, or
   a median of the pixel values in the first image that falls within the peak region of the histogram.

9. The method of claim 1, wherein the transformation which reduces the bit depth of each pixel value in the second image includes a linear stretching.

10. The method of claim 1, further comprising:
    buffering the calculated pixel value differences in an image buffer.

11. The method of claim 1, wherein the first image and the second image are thermal images.

12. A processing device for reducing a dynamic range of an image, comprising:
    circuitry configured to receive a first image and a second image which have pixel values of a first bit depth, wherein each pixel in the first image has a spatially corresponding pixel in the second image, and wherein the first and the second image are either the same image or subsequent images in a video sequence,
    circuitry configured to analyze a histogram of the pixel values in the first image to identify one or more peak regions in the histogram and a representative pixel value of each peak region,
    circuitry configured to calculate a pixel value difference for each pixel in the first image, wherein
    for each pixel in the first image having a pixel value within a peak region, the pixel value difference is a difference between the pixel value of the pixel in the first image and the representative pixel value of the peak region, and
    for each pixel in the first image having a pixel value outside the one or more peak regions, the pixel value difference is zero,
    circuitry configured to transform the second image to reduce its dynamic range by applying a transformation which reduces a bit depth of each pixel value in the second image from the first bit depth to a second, lower, bit depth, and
    circuitry configured to, for each pixel in the transformed second image, adding the pixel value difference calculated for a spatially corresponding pixel in the first image to the pixel value of the pixel in the transformed second image.

13. A non-transitory computer readable medium having computer instructions stored thereon which, when executed by a device having processing capability, causes the device to carry out a method for reducing a dynamic range of an image, comprising:
    receiving a first image and a second image which have pixel values of a first bit depth, wherein each pixel in the first image has a spatially corresponding pixel in the second image, and wherein the first and the second image are either the same image or subsequent images in a video sequence,
    analyzing a histogram of the pixel values in the first image to identify one or more peak regions in the histogram and a representative pixel value of each peak region,
    calculating a pixel value difference for each pixel in the first image, wherein
    for each pixel in the first image having a pixel value within a peak region, the pixel value difference is a difference between the pixel value of the pixel in the first image and the representative pixel value of the peak region, and
    for each pixel in the first image having a pixel value outside the one or more peak regions, the pixel value difference is zero,
    transforming the second image to reduce its dynamic range by applying a transformation which reduces a bit depth of each pixel value in the second image from the first bit depth to a second, lower, bit depth, and for each pixel in the transformed second image, adding the pixel value difference calculated for a spatially corresponding pixel in the first image to the pixel value of the pixel in the transformed second image.

\* \* \* \* \*